United States Patent
Hieda et al.

(10) Patent No.: US 8,298,690 B2
(45) Date of Patent: Oct. 30, 2012

(54) MAGNETIC RECORDING MEDIUM, METHOD AND APPARATUS FOR MANUFACTURING MAGNETIC RECORDING APPARATUS

(75) Inventors: Hiroyuki Hieda, Yokohama (JP); Kazuto Kashiwagi, Ome (JP); Akira Kikitsu, Yokohama (JP); Yousuke Isowaki, Yokohama (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 12/292,564

(22) Filed: Nov. 20, 2008

(65) Prior Publication Data
US 2009/0135519 A1 May 28, 2009

(30) Foreign Application Priority Data
Nov. 22, 2007 (JP) ................................. 2007-303570

(51) Int. Cl.
*G11B 5/65* (2006.01)
(52) U.S. Cl. .................................................. 428/836
(58) Field of Classification Search .................... 428/836
See application file for complete search history.

(56) References Cited

U.S. PATENT DOCUMENTS

| | | | |
|---|---|---|---|
| 5,652,054 A | 7/1997 | Kikitsu et al. | |
| 5,956,216 A | 9/1999 | Chou | |
| 6,174,597 B1 | 1/2001 | Yusu et al. | |
| 6,420,058 B1 | 7/2002 | Haratani et al. | |
| 6,602,620 B1 | 8/2003 | Kikitsu et al. | |
| 6,770,388 B2 | 8/2004 | Uwazumi et al. | |
| 6,841,224 B2 | 1/2005 | Kamata et al. | |
| 6,972,923 B2 | 12/2005 | Akiyama et al. | |
| 7,097,924 B2 | 8/2006 | Haginoya et al. | |
| 7,141,317 B2 | 11/2006 | Kikitsu et al. | |
| 7,203,969 B2 | 4/2007 | Sakurai et al. | |
| 7,223,439 B2 | 5/2007 | Suwa et al. | |
| 7,323,258 B2 | 1/2008 | Kamata et al. | |
| 2002/0142192 A1 | 10/2002 | Kamata et al. | |
| 2004/0051994 A1 | 3/2004 | Akiyama et al. | |
| 2004/0107355 A1 | 6/2004 | Sakurai et al. | |
| 2004/0131890 A1 | 7/2004 | Kikitsu et al. | |
| 2004/0191577 A1 | 9/2004 | Suwa et al. | |
| 2005/0069732 A1 | 3/2005 | Kamata et al. | |
| 2006/0172154 A1* | 8/2006 | Suwa et al. .................. | 428/836 |

(Continued)

FOREIGN PATENT DOCUMENTS

JP 59-139138 8/1984

(Continued)

OTHER PUBLICATIONS

B. Gooch et al., "A High Resolution Flying Magnetic Disk Recording System With Zero Reproduce Spacing Loss," IEEE Transactions on Magnetics, vol. 27, No. 6, Nov. 1991, pp. 4549-4554.

(Continued)

*Primary Examiner* — Holly Rickman
*Assistant Examiner* — Linda Chau
(74) *Attorney, Agent, or Firm* — Nixon & Vanderhye, P.C.

(57) ABSTRACT

A magnetic recording medium includes a disk substrate, and recording cells arrayed on the disk substrate in a track direction, the recording cells includes a ferromagnetic pattern and a magnetic pattern formed on one of two sidewalls of the ferromagnetic pattern in the track direction and having a lower crystalline magnetic anisotropy constant Ku than that of the ferromagnetic pattern.

9 Claims, 5 Drawing Sheets

U.S. PATENT DOCUMENTS

2006/0183004 A1\* 8/2006 Hattori et al. .............. 428/833.1
2007/0015011 A1  1/2007 Kikitsu et al.
2007/0217072 A1  9/2007 Oikawa

FOREIGN PATENT DOCUMENTS

| JP | 2003-157507 | 5/2003 |
|----|-------------|--------|
| JP | 2004-295989 | 10/2004 |
| JP | 2006-164349 | 6/2006 |

OTHER PUBLICATIONS

Kikitsu et al., U.S. Appl. No. 10/668,231, filed Sep. 24, 2003.
Kikitsu et al., U.S. Appl. No. 11/534,278, filed Sep. 22, 2006.
B. Gooch, et al. "A High Resolution Flying Magnetic Disk Recording System with Zero Reproduce Spacing Loss", IEEE Transactions on Magnetics, vol. 27, No. 6, Nov. 1991, pp. 4549-4554.

\* cited by examiner

MAGNETIC RECORDING MEDIUM, METHOD AND APPARATUS FOR MANUFACTURING MAGNETIC RECORDING APPARATUS

CROSS-REFERENCE TO RELATED APPLICATIONS

This application is based upon and claims the benefit of priority from prior Japanese Patent Application No. 2007-303570, filed Nov. 22, 2007, the entire contents of which are incorporated herein by reference.

BACKGROUND OF THE INVENTION

1. Field of the Invention

The present invention relates to a magnetic recording medium used for high-density magnetic recording, a method and an apparatus for manufacturing the magnetic recording medium, and a magnetic recording apparatus using the magnetic recording medium.

2. Description of the Related Art

Magnetic recording apparatuses such as hard disk drives (HDD) are increasingly used widely with widespread use of personal computers. In recent years, with the advent of the Internet and DVDs storing high-definition image information, the amount of information to be processed is increasing rapidly and demands for larger capacities are growing. Further, small-sized HDDs are mounted in mobile devices such as mobile phones, car navigation systems, and MP3 players, raising expectations for still higher density. Such a situation can be considered to have been brought about by rapid improvement in recording density of HDDs. In HDDs, recording density is improved by forming still smaller magnetic recording marks. To form still smaller marks, a still smaller write head, a read head capable of detecting a still lower magnetic field, and a magnetic recording medium capable of writing still smaller marks with stability are needed.

Conventionally, magnetic grains constituting a magnetic recording layer deposited by sputtering have been made finer to form still smaller marks for magnetic recording medium. However, due to degraded thermal stability of fine magnetic grains or a so-called thermal fluctuation problem, making magnetic grains finer is becoming more and more difficult. Thermal stability of magnetic material itself may be improved to solve the thermal fluctuation problem, but this also increases resistance to a recording magnetic field, making a more intense magnetic field necessary for recording. However, magnetic field strength obtained from a write head is currently approaching its limit.

Against the background described above, a patterned medium having a structure significantly different from that of a conventional magnetic recording medium has been proposed. In the patterned medium, recording cells, which are the minimum recording units, are arrayed on tracks by lithography. While data is written onto an aggregation of several tens to several hundreds of magnetic grains even for a minimum recording mark in a conventional magnetic recording layer deposited by sputtering, the size of magnetic grains can be increased to that of recording cells formed by lithography in the patterned medium. Therefore, the patterned medium can fundamentally solve the thermal fluctuation problem resulting from finer magnetic grains.

Because the position of each recording cell to which data is written is fixed in a patterned medium, it becomes difficult to write data of a desired polarity if a recording magnetic field is not generated at synchronized timing when a write pole comes immediately above the recording cell. Particularly when recording density has improved and linear recording density has increased, precision required for write timing becomes higher, which presents a formidable challenge in making a magnetic recording apparatus using a patterned medium denser. In order to solve the problem, a method of forming phase information of recording cells on a medium to synchronize timing has been proposed. See, for example, JP-A 2006-164349 (KOKAI) and JP-A 2003-157507 (KOKAI).

Whether data is written when a recording magnetic field is applied to a certain recording cell needs to be uniquely determined depending on the position where the recording magnetic field is applied. When recording cells are ideally magnetically homogeneous, if a recording magnetic field is applied upstream from the central position of a recording cell in the traveling direction of a head, data is written into the recording cell. If a recording magnetic field is applied downstream from the central position, no data is written into the recording cell. That is, a timing margin for writing data into a certain recording cell will be a duration in which the head is positioned between the central position of the recording cell and that of an adjacent recording cell. However, magnetic characteristics of recording cells cannot be actually homogeneous inside the recording cells. Therefore, in a certain recording cell, there is a point that determines whether data is written into a position deviating from the central position of the recording cell. Such dispersion of recording points reduces the timing margin for applying a recording magnetic field. That is, if a recording magnetic field is applied within the range of dispersion thereof, whether data is written into a certain dot will not be determined. Therefore, a recording magnetic field needs to be applied in a narrow range excluding the width thereof so that timing to apply a recording magnetic field will have to be controlled more precisely. Such dispersion can probably be caused by heterogeneity of composition when magnetic recording films are deposited, distribution of impurities, heterogeneity of damage when recording cells are processed and the like.

BRIEF SUMMARY OF THE INVENTION

A magnetic recording medium according to one aspect of the present invention comprises: a disk substrate; and recording cells arrayed on the disk substrate in a track direction, the recording cell comprising a ferromagnetic pattern and a magnetic pattern formed on one of two sidewalls of the ferromagnetic pattern in the track direction and having a lower crystalline magnetic anisotropy constant Ku than that of the ferromagnetic pattern.

A method for manufacturing a magnetic recording medium according to another aspect of the present invention comprises: depositing a ferromagnetic layer on a disk substrate; patterning the ferromagnetic layer to form ferromagnetic patterns arrayed in a track direction; and depositing a magnetic material having a crystalline magnetic anisotropy constant Ku lower than that of the ferromagnetic pattern by sputtering from an oblique direction with respect to the ferromagnetic pattern to form a magnetic pattern on one of two sidewalls in the track direction of the ferromagnetic pattern.

A method for manufacturing a magnetic recording medium according to another aspect of the present invention comprises: depositing a ferromagnetic layer on a disk substrate; patterning the ferromagnetic layer to form ferromagnetic patterns arrayed in a track direction; and applying an ion beam from an oblique direction with respect to the ferromagnetic pattern to convert a part of one of two sidewalls in the track direction of the ferromagnetic pattern to a magnetic pattern having a lower crystalline magnetic anisotropy constant Ku than that of the ferromagnetic pattern.

An apparatus for manufacturing a magnetic recording medium according to another aspect of the present invention comprises: a motor configured to rotate a disk substrate on which ferromagnetic patterns are formed; a sputtering source or an ion beam source disposed in an oblique direction with respect to the disk substrate; and a mask having an opening provided between the disk substrate and the sputtering source or ion beam source so as to expose a part of the substrate from an inner periphery to an outer periphery.

DETAILED DESCRIPTION OF THE INVENTION

Embodiments of the present invention will be described below in detail.

Figure 1A:
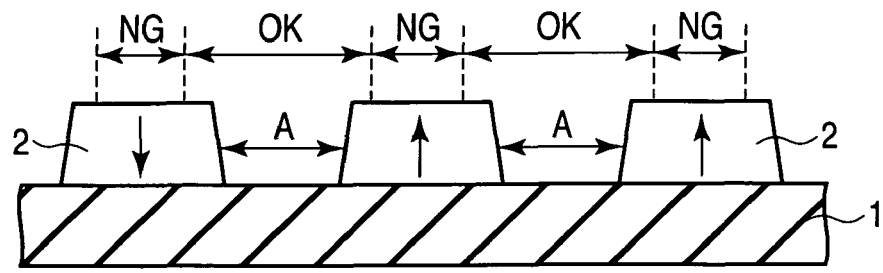
FIGS. 1A and 1B are diagrams illustrating a margin in writing a data to a patterned medium.

First, problems when writing data into a patterned medium will be described with reference to FIG. 1. FIG. 1A shows a state in which recording cells 2 formed of a ferromagnetic material are arrayed on a disk substrate 1 in the track direction.

In a patterned medium, polarity of magnetization of the recording cells 2 adjacent to each other can reliably be reversed by switching a recording magnetic field in a gap region (A region) between the recording cells 2. However, if switch timing of recording is shifted and a recording magnetic field is switched above some recording cell 2, whether magnetization of the recording cell 2 is reversed may not be determined. When magnetic properties inside the recording cell 2 are homogeneous, if a magnetic field is applied in a range wider than half the recording cell 2, magnetization reversal of the recording cell 2 is caused. If a magnetic field is applied in a range narrower than half the recording cell 2, however, magnetization reversal of the recording cell 2 is not caused. Therefore, in such a case, if a write field is reversed between the central position of some recording cell 2 and that of the adjacent recording cell 2, magnetizations of the two recording cells 2 can be reversed.

However, magnetic properties inside the recording cell 2 are not necessarily homogeneous. For example, dispersion in size or shape of the recoding cells 2 and difference in distribution of crystal defects, grain boundaries, or impurities inside the recording cell 2 brings about dispersion in a position where write switching of the recording cell 2 is caused. Since whether magnetization reversal occurs is not determined in the range in which the above dispersion occurs, the margin of switch timing of the recording magnetic field is reduced. In FIG. 1A, the range in which switching of a recording magnetic field is enabled is denoted by OK and the range in which switching of a recording magnetic field is disabled is denoted by NG (The same notation is used in other drawings).

Figure 1B:
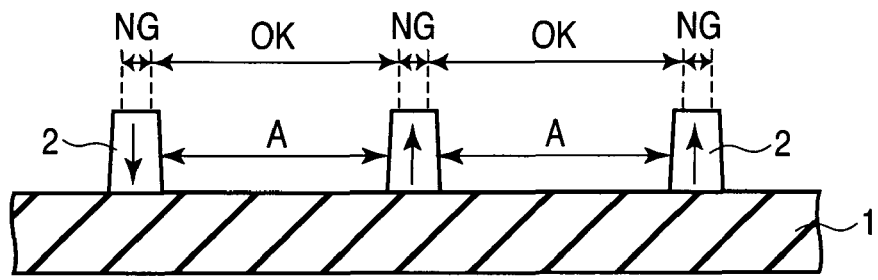

Making the gap between the recording cells 2 wider, as shown in FIG. 1B, can increase the timing margin to switch a recording magnetic field. However, in this case, the recording cell 2 is made smaller and a leakage magnetic field from each of the recording cells 2 in a read operation becomes insufficient, making the read operation difficult.

Figure 2A:
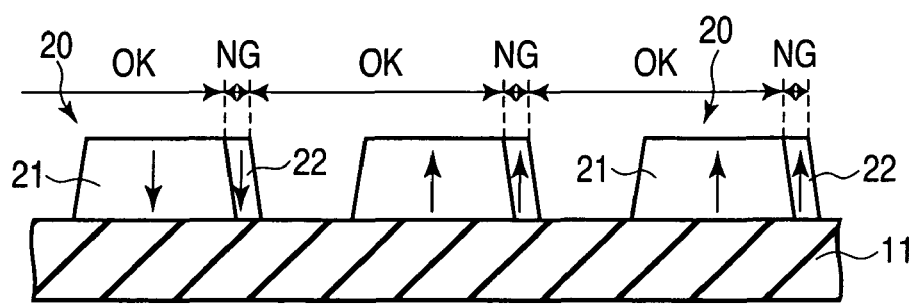
FIG. 2A is a cross-sectional view of a magnetic recording medium according to an embodiment of the present invention and FIG. 2B is a conceptual diagram showing a distribution in the track direction of reversal magnetic field strength of such the magnetic recording medium in FIG. 2A.

FIG. 2A shows a cross-sectional view of a magnetic recording medium according to an embodiment of the present invention. The figure is a cross-sectional view in the track direction in which the horizontal direction is the track direction. A magnetic underlayer (not shown) and an intermediate layer (not shown) are formed on a non-magnetic disk substrate 11 and recording cells 20 arrayed in the track direction are formed thereon. The recording cell 20 comprises a ferromagnetic pattern 21 and a magnetic pattern 22 formed on one sidewall on the upstream side or downstream side of two sidewalls in the track direction of the ferromagnetic pattern 21. The ferromagnetic pattern 21 and the magnetic pattern 22 are coupled by exchange coupling. The magnetic pattern 22 has a lower crystalline magnetic anisotropy constant Ku than the ferromagnetic pattern 21. Ku of the material for the ferromagnetic pattern 21 is $0.5 \times 10^6$ erg/cc or more, preferably $1 \times 10^6$ erg/cc or more. Ku of the material for the magnetic pattern 22 is $1 \times 10^5$ erg/cc or less, preferably $1 \times 10^4$ erg/cc or less.

Figure 2B:
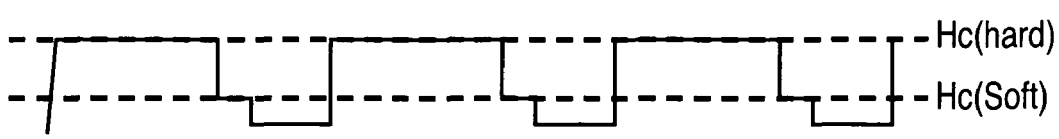

FIG. 2B conceptually shows a distribution in the track direction of reversal magnetic field strength of such a magnetic recording medium. The reversal magnetic field strength (Hc (hard)) in an area of the ferromagnetic pattern 21 is high and the reversal magnetic field strength (Hc (soft)) in an area of the magnetic pattern 22 is low. In this case, if a recording magnetic field H (w) satisfying conditions Hc (soft)<H (w)<Hc (hard) is applied to the magnetic pattern 22, the magnetic pattern 22 easily causes magnetization reversal, and the magnetization reversal propagates to the whole ferromagnetic pattern 21 because the magnetic pattern 22 and the ferromagnetic pattern 21 are exchange coupled, so that a data is written into the recording cell. If no magnetic field is applied to the magnetic pattern 22, the recording magnetic field H (w) alone cannot reverse the magnetization of the ferromagnetic pattern 21, no magnetization reversal occurs in the recording cell 20. Therefore, if a recording magnetic field is switched in an area outside the magnetic pattern 22, which recording cell 20 is reversed will uniquely be determined. This means that the timing margin for switching the recording magnetic field has a broader width of an area outside the magnetic pattern 22.

As is apparent from FIG. 2B, when compared with a recoding cell formed from the ferromagnetic pattern only, data can be written with a lower recording magnetic field. With increasingly finer recording cells, a patterned medium is also subject to thermal fluctuation, making it unavoidable to use a ferromagnetic material having a higher Ku. Even in that case, a magnetic recording medium according to the present invention is effective for higher density because a recording magnetic field can be made lower.

The timing margin for switching a write field is determined by the interface between the magnetic pattern 22 and the ferromagnetic pattern 21 in the magnetic recording medium according to an embodiment of the present invention. The thickness of the magnetic pattern 22 is not particularly limited. This is because if a part of the magnetic pattern 22 is reversed by a recording magnetic field, magnetization reversal is propagated to the whole magnetic pattern 22 and further to the whole ferromagnetic pattern 21 through the exchange coupling. It is preferable, however, to provide a gap or non-magnetic material to cut off the exchange coupling interaction between adjacent recording cells.

Figure 3:
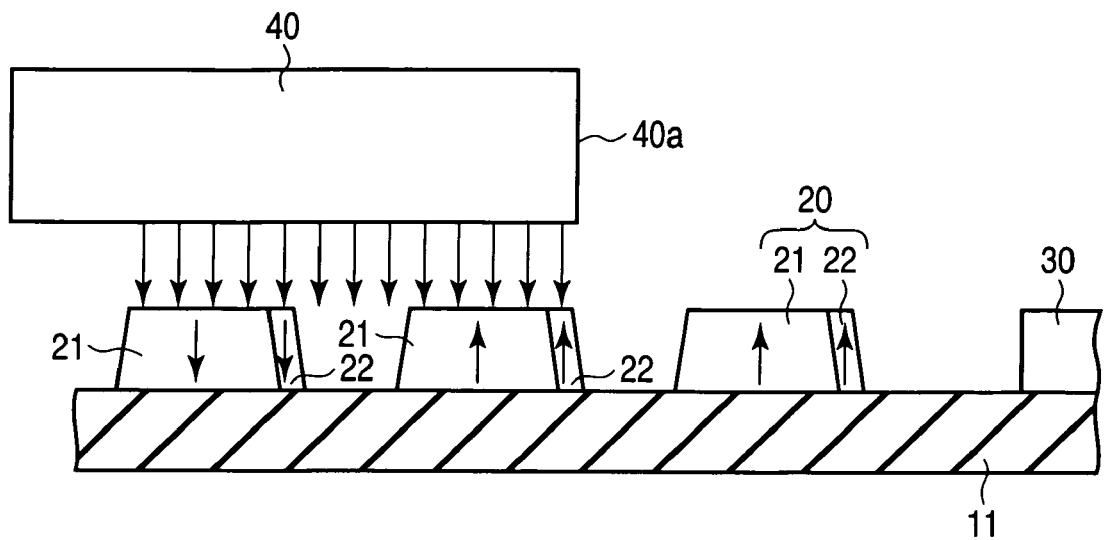
FIG. 3 is a cross-sectional view showing a spatial relationship between the magnetic recording medium according to the one embodiment of the present invention and a magnetic head.

The magnetic pattern 22 may be formed on the sidewall of any side of the ferromagnetic pattern 21 in the track direction. As shown in FIG. 3, the magnetic pattern 22 of some recording cell 20 is formed on the sidewall of the ferromagnetic pattern 21 in the track direction. The magnetic pattern 22 is preferably formed on the side of a servo zone 30 in the track direction. The servo zone 30 corresponds to the track including the recording cells 20. In other words, the magnetic pattern 22 of some recording cell 20 is preferably formed on the sidewall of the ferromagnetic pattern 21 on the side of a trailing edge 40a of a recording head 40. The servo zone 30 may be formed by writing servo signals into the ferromagnetic layer or, like the recording cells, by patterning ferromagnetic material to patterns corresponding to servo signals.

An effect of the ferromagnetic pattern 21 and the magnetic pattern 22 of the recording cell 20 being in the above spatial relationship will be described. The switching position of the recording cell 20 is determined by the position of the trailing edge 40a when the recording head 40 switches a recording magnetic field. If the magnetic pattern 22 is provided on the sidewall of the ferromagnetic pattern 21 on the side of the trailing edge 40a of the recording head 40, and a magnetic field is applied to the whole recording cell 20 including the magnetic pattern 22, a data is written into the recording cell 20. In this case, if the magnetic pattern 22 is reversed by a recording magnetic field, because the magnetic field is applied to the whole ferromagnetic pattern 21, the ferromagnetic pattern 21 is also assisted in magnetization reversal by the recording magnetic field so that magnetization inside the recording cell 20 is reversed more easily all at once.

Figure 4A:
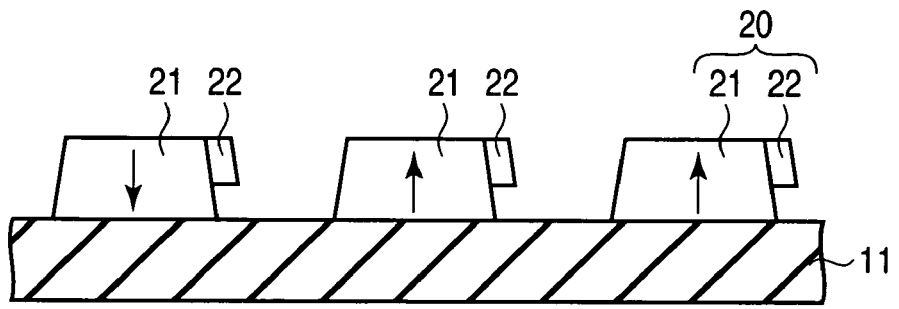
FIGS. 4A and 4B are cross-sectional views of magnetic recording media according to another embodiment of the present invention.
Figure 4B:
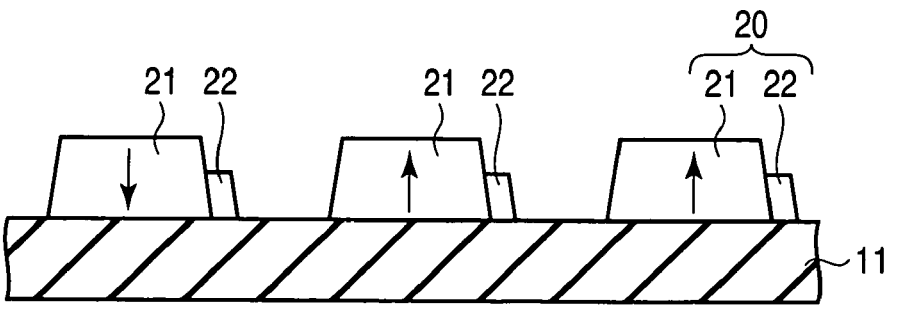

Note that, as shown in FIGS. 4A and 4B, the magnetic pattern 22 may be formed on a part of the sidewall of the ferromagnetic pattern 21.

Next, the method for manufacturing a magnetic recording medium according to an embodiment of the present invention will be described with reference to FIGS. 5A to 5F.

Figure 5A:
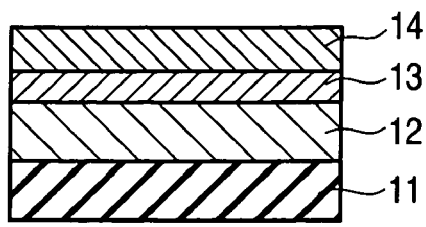
FIGS. 5A, 5B, 5C, 5D, 5E and 5F are cross-sectional views showing a method for manufacturing the magnetic recording medium according to the one embodiment of the present invention.

As shown in FIG. 5A, a magnetic underlayer 12, an intermediate layer 13, and a ferromagnetic recording layer 14 are formed on the non-magnetic disk substrate 11.

Figure 5B:
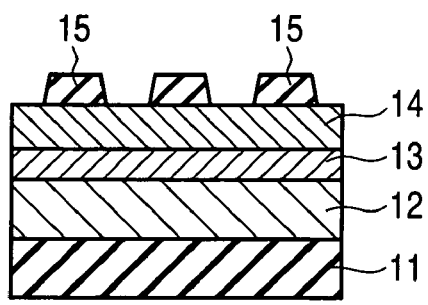

As shown in FIG. 5B, for example, etching masks 15 made of carbon are formed on the ferromagnetic recording layer 14 by patterning. At this point, etching masks for patterns to be servo signals including positioning data and address data are formed simultaneously with the etching masks 15 for the ferromagnetic patterns.

Figure 5C:
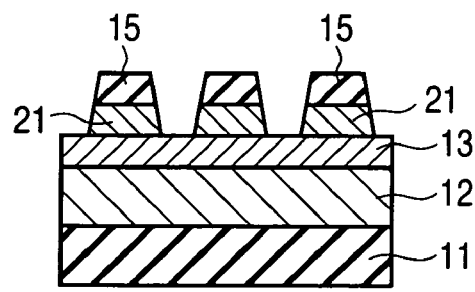

As shown in FIG. 5C, the ferromagnetic patterns 21 are formed by etching the ferromagnetic recording layer 14. The depth of etching may be an intermediate part or the bottom of the ferromagnetic recording layer 14, an intermediate part or the bottom of the intermediate layer 13, or an intermediate part or the bottom of the magnetic underlayer 12. Dry etching is used for etching the magnetic materials. As dry etching, ion milling using an ion beam of Ar, Ne, Kr, Xe and the like, reactive ion etching (RIE) using a chlorine gas, RIE using a mixed gas of $CO/NH_3$, or RIE using a methanol gas may be employed.

Figure 5D:
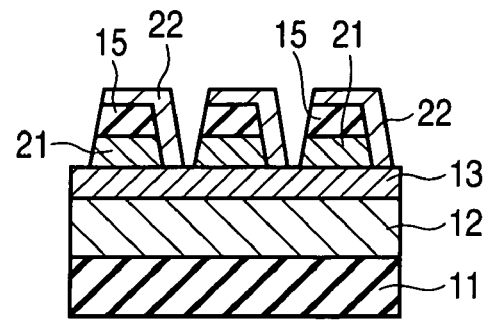

As shown in FIG. 5D, the magnetic pattern 22 is formed on one sidewall in the track direction of the ferromagnetic pattern 21. The method of forming the magnetic pattern 22 will be described later in detail.

At this point, the etching masks 15 are left without being peeled off. If the etching masks 15 are left, the magnetic pattern 22 can be prevented from being formed on the upper surface of the ferromagnetic pattern 21.

Figure 5E:
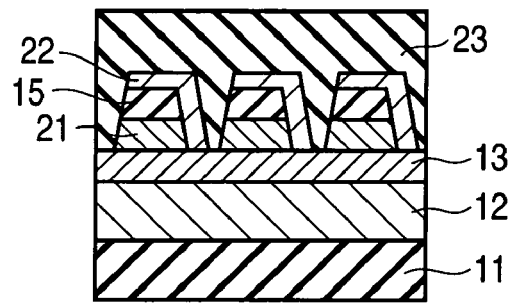

As shown in FIG. 5E, a non-magnetic filling layer 23 is deposited on the whole surface. Before depositing the non-magnetic filling layer 23, residues of the etching masks 15 may be removed.

Figure 5F:
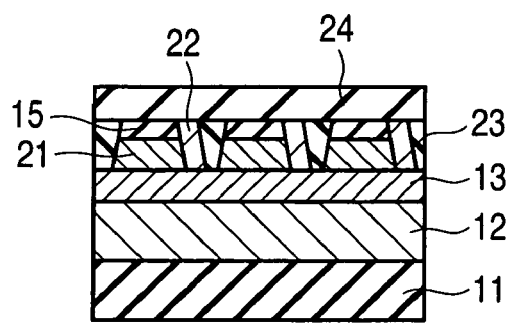

As shown in FIG. 5F, the non-magnetic filling layer 23 on the upper surface of the recording cell is made sufficiently thin or the upper surface of the ferromagnetic pattern 21 is exposed by etch-back. Dry etching is used for etch-back. RIE may also be used for etching the non-magnetic filling layer 23. In the case where the material of the non-magnetic filling layer 23 is, for example, Si, $SiO_2$, Ti, Ta, or W, RIE can be performed using a fluorine-containing gas such as $CF_4$. In the case where the material of the non-magnetic filling layer 23 is carbon or diamond-like carbon, RIE can be performed using oxygen. For materials to which RIE cannot be performed, etch-back is performed by ion milling. Since it is necessary to perform etch-back three different materials of the non-magnetic filling layer, magnetic pattern, and etching mask, ion milling is useful. Alternatively, RIE and ion milling may be performed sequentially or alternately. After performing etch-back, a protective layer 24 is deposited. Further, a lubricant is applied onto the protective layer 24.

Next, a method of forming the magnetic pattern 22 on one sidewall of the ferromagnetic pattern 21 in the step of FIG. 5D will be described.

In a patterned medium for hard disk drive, recording cells are arrayed on a circumferential track. Since the magnetic pattern 22 is formed on one sidewall of the ferromagnetic pattern 21, it is necessary, for example, to deposit the magnetic pattern 22 by applying sputtered particles from the track direction and an oblique direction with respect to the ferromagnetic patterns 21. However, it is difficult to deposit such a film using a current deposition apparatus.

Figure 6:
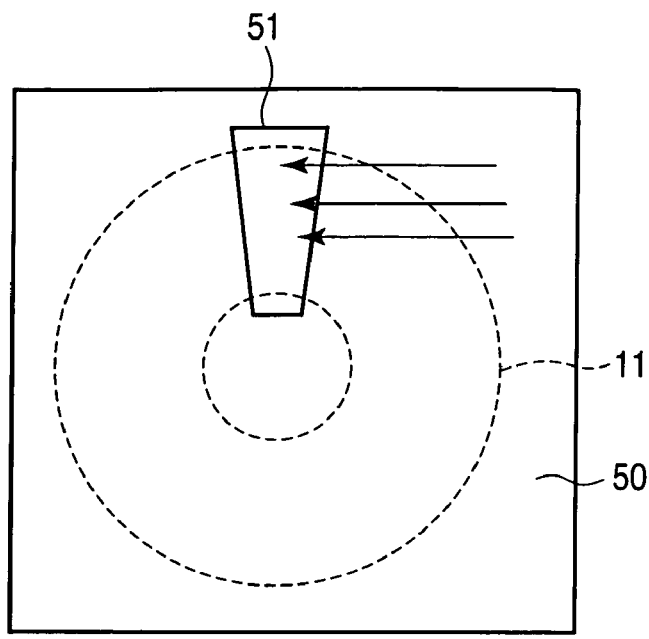
FIG. 6 is a plan view showing a mask used for forming a magnetic pattern.
Figure 7:
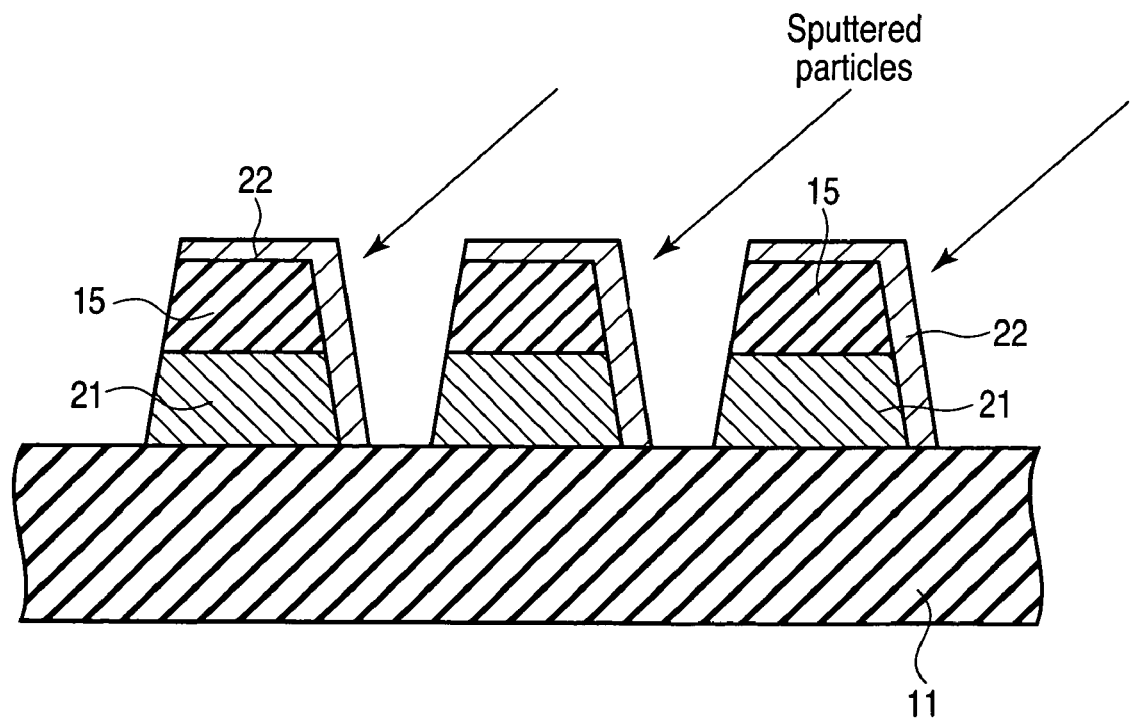
FIG. 7 is a cross-sectional view showing an example of a ferromagnetic pattern and a magnetic pattern.

In an embodiment of the present invention, as shown in FIG. 6, a mask (masking shield) 50 having an opening 51 exposing a part of the disk substrate 11 from the inner periphery to the outer periphery is disposed above the disk substrate 11 and sputtered particles are incident onto the disk substrate 11 while the disk substrate 11 being rotated. According to such a method, as shown in FIG. 7, the magnetic pattern 22 can be formed on one sidewall in the track direction of all the ferromagnetic patterns 21.

The shape of the opening 51 of the mask (masking shield) 50 is preferably fan-shaped with two sides perpendicular to the radial direction of the disk substrate 11. By depositing a film through the opening 51 while the disk substrate 11 is being rotated at a constant speed, the magnetic pattern 22 having a uniform thickness on the whole surface can be deposited. It is preferable that the angle of aperture of the opening 51 with respect to the center of the disk substrate 11 is as small as possible to deposit the magnetic pattern 22 in a desired part of the ferromagnetic pattern 21, if the angle of aperture is too small, it will take a long time to deposit the film.

Figure 8:
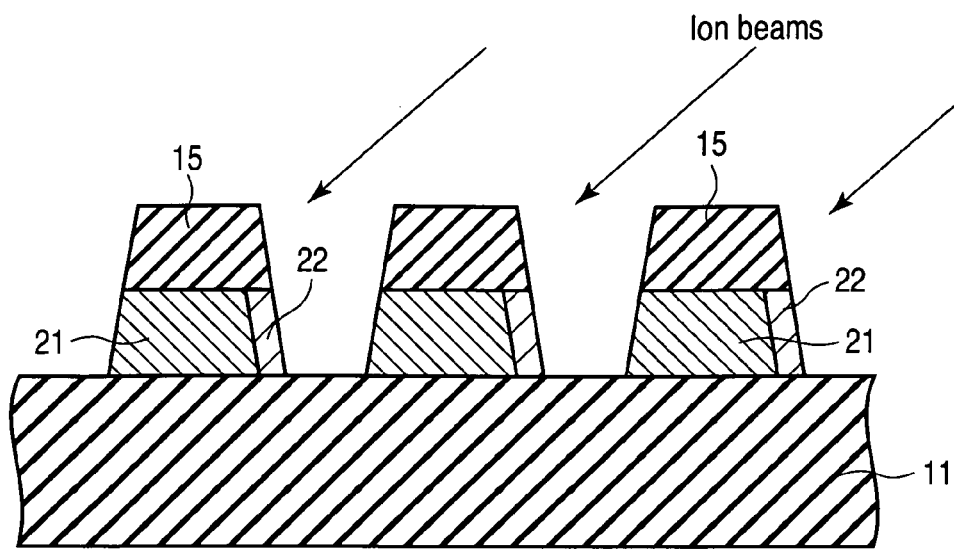
FIG. 8 is a cross-sectional view showing another example of a ferromagnetic pattern and a magnetic pattern.

As shown in FIG. 8, the magnetic pattern 22 may be formed by irradiating the sidewall of the ferromagnetic pattern 21 with an ion beam. Defects are introduced into the sidewall of the ferromagnetic pattern 21 by irradiation with an ion beam and a part thereof becomes the magnetic pattern 22 having a low Ku. Also in this case, the mask (masking shield) 50 similar to that in FIG. 6 is used and an ion beam is applied through the opening 51 while the disk substrate 11 is being rotated.

Materials and processes used by the method for manufacturing a magnetic recording medium according to embodiments of the present invention will be supplementarily described below.

Materials of a non-magnetic substrate include glass, Si, Al, and resin material such as polycarbonate. Glass or Si is preferable from the viewpoint of planarity. Resin material such as polycarbonate is preferable from the viewpoint of low cost and weight reduction.

Magnetic material comprising at least one of elements Fe, Ni and Co in composition can be used as the magnetic underlayer. For example, CoFe, NiFe, CoZrNb, ferrite, ferrosilicon, and ferrocarbon can be used. The fine structure of the magnetic underlayer may be an amorphous structure or crystal structure. Also, the fine structure may be a granular structure in which magnetic fine particles are present in a non-magnetic matrix or may consist of layers having different magnetic characteristics. The direction of magnetic anisotropy of the magnetic underlayer may be the perpendicular direction to the film plane, in-plane circumferential direction, in-plane radial direction, or composition thereof. Any material having such a coercivity may be used for magnetic underlayer that the magnetization direction changes with a magnetic field from the magnetic head in a write operation to form a closed magnetic loop including the magnetic head. Generally, the coercivity is preferably several kOe or less, more preferably 1 kOe or less, particularly preferably 500 Oe or less. The magnetic underlayer can be deposited on a non-magnetic substrate by sputtering.

Ferromagnetic materials generally used for current perpendicular magnetic recording media can be used for a ferromagnetic pattern (ferromagnetic recording layer). For example, a material selected from the group consisting of Co, Pt, Sm, Fe, Ni, Cr, Mn, Bi, and Al and alloys thereof can be used. Among these, a Co alloy having high crystalline magnetic anisotropy, particularly Co alloys based on CoPt, SmCo, and CoCr, and ordered alloys such as FePt and CoPt are preferable. More specifically, CoCr, CoPt, CoCrTa, CoCrPt, CoCrPtTa, FePt, CoPt, and FePd are preferable. The composition ratios of these alloys are not particularly limited and alloys with optimal magnetic characteristics can be used. Also, rare earth-transition metal alloys, multilayer films (artificial lattice film) of magnetic layers and non-magnetic layers, and ferrite can be used. More specifically, TbFe, TbFeCo, TbCo, GdTbFeCo, GdDyFeCo, NdFeCo, NdTbFeCo, Co/Pt artificial lattice films, Co/Pd artificial lattice films, Co ferrite, and Ba ferrite can be used. Moreover, additives to improve magnetic characteristics may be added to these materials. For example, metals such as Cr, Nb, V, Pt, Pd, Ru, Ti, Ta, Mo, W, Hf, In, Zn, Mg, C, B, Si, and Al, alloys of these metals, or compounds of these metal elements and at least one element selected from a group of oxygen, nitrogen, carbon, and hydrogen may be added as additives. These ferromagnetic recording layers can be deposited by sputtering.

An intermediate layer is formed between the ferromagnetic layer and the magnetic underlayer. A main purpose of the intermediate layer is to control magnetic anisotropy of the ferromagnetic layer. The intermediate layer may consist of, for example, metals such as Cr, Nb, V, Pt, Pd, Ru, Ti, Ta, Mo, W, Hf, In, Zn, Mg, C, B, Si, and Al, alloys of these metals, compounds of these metal elements and at least one element selected from a group of oxygen, nitrogen, carbon, and hydrogen, or a laminated structure of metals or compounds selected from these metals and compounds. The intermediate layer can also be deposited by sputtering.

The formation of an etching mask in the step of FIG. 5B will be described in detail. The recording density required for a patterned medium is 1 Tbpsi or more. This means that even a recording mark of the aspect ratio 1 needs a pattern of a 25 nm-pitch. The only conventional method capable of forming a recording mark of such high density is electron beam lithography. However, electron beam lithography is a method of very low throughput and drawing patterns after directly applying a resist to the disk is not realistic from the viewpoint of mass production of media. Thus, the pattern forming method based on nano-imprinting is effective. According to the nano-imprinting, stampers are produced by electroforming from a master pattern formed by electron beam lithography. Normally, Ni stampers formed by electroforming are used. Patterns are formed by pressing the Ni stamper against a pattern transfer film formed on a substrate.

The nano-imprinting includes thermal imprinting by which thermoplastic resin is used as a pattern transfer film and an Ni stamper is pressed while being heated and optical imprinting by which photo-curable resin is used as a pattern transfer film and patterns are set by pressing an ultraviolet permeable stamper such as quartz glass and applying ultraviolet light to cure the resin. Room temperature imprinting is also known as an improved thermal imprinting by which a material having relatively high pattern transfer properties even at room temperature is used as a pattern transfer film. In the room temperature imprinting, spin-on glass (SOG), for example, is used as a pattern transfer film.

Since residues of a pattern transfer film remain on the bottoms of recesses after pattern transfer process in the imprinting, it is necessary to remove the residues before processing by etching underlying layers. If carbon-based resist material is used as the pattern transfer film, residues can be removed by oxygen RIE. If Si-based material such as SOG is used as the pattern transfer film, residues can be removed by RIE using a fluorine-containing gas such as $CF_4$.

Patterns of protrusions and recesses formed by nano-imprinting can be used as etching mask patterns. Moreover, if pattern transfer to a material of high selectivity to dry etching for etching the next ferromagnetic recording layer is further performed, the aspect ratio of etching masks can be enhanced. When, for example, a ferromagnetic recording layer is etched by RIE using a $CO/NH_3$ mixed gas or methanol gas, if a hard mask of Ti or Ta is used, it is known that the ferromagnetic recording layer can be processed with a high selectivity ratio. In such a method of forming a hard mask layer of Ti and Ta on the ferromagnetic recording layer, applying a carbon-based resin film, forming patterns of protrusions and recesses by nano-imprinting, and transferring the patterns to Ti or Ta by RIE using a $CF_4$ gas, etching masks that can be used for RIE using a $CO/NH_3$ mixed gas or methanol gas can be formed.

When SOG is used as a pattern transfer film, if a carbon-based resist film or carbon film is formed under the pattern transfer film, patterns of protrusions and recesses of SOG can be transferred to the carbon-based resist film or carbon film by oxygen RIE. At this point, because the selectivity ratio between SOG and the carbon-based resist film or carbon film is very high (almost infinite), the aspect ratio of patterns formed by nano-imprinting can be made very high. Carbon and the thermoset resist film are also resistant to ion milling and thus are very effective as etching masks for the ferromagnetic recording layer.

While electron beam lithography is described above as a pattern drawing method, lithography using self-assembly to further make processing finer. In lithography with self-assembly, a method of orienting an array obtained by self-assembly using a guide structure on a circumferential track. A block copolymer can be used as the self-assembly material. The block copolymer is a copolymer having plural types of polymers as constituents. For example, in a block copolymer consisting of a polymer chain A and a polymer chain B, a phase separated structure in which the A phase and B phase are separated is formed because the polymer chain A and the polymer chain B are apt to separate from each other. The polymer chain A and the polymer chain B are covalently bonded and therefore, sizes of the A phase and B phase correspond to molecule volumes, forming a fine and highly regular arrayed structure. Moreover, one of the A phase and B phase can be removed by making use of difference in etching rates of the A phase and B phase and after removal thereof, a structure of protrusions and recesses is formed, which can be used as etching masks.

For example, a combination of an aromatic polymer, such as polystyrene, polyvinyl naphthalene, poly($\alpha$-methylstyrene) and polyvinyl pyridine, with high dry etching resistance and an acryl-based polymer, such as polymethyl methacrylate, with low dry etching resistance can be used.

A block copolymer containing a metal element such as Si in one polymer chain is also effective. In this case, the polymer chain containing the metal element shows very high etching resistance against oxygen etching and therefore, a structure of protrusions and recesses can be formed effectively. For example, a polymer chain containing the metal element such as polydimethyl siloxane and polyferrocenylsilane can be used.

By filling a material containing another metal element in recesses after forming the structure of protrusions and recesses, patterns can be transferred to the underlying polymer or the carbon-based film below the recesses to form protrusions and recesses with a high aspect ratio. For example, in a method of removing a portion of polymethyl methacrylate in a phase separated structure of a polystyrene-polymethyl methacrylate block copolymer by oxygen RIE, filling recessed with SOG, and further performing oxygen RIE, patterns of protrusions and recesses with a high aspect ratio made of SOG can be provided.

Self-assembly lithography using a block copolymer can be used as a method of forming etching masks directly on a ferromagnetic recording layer, but also as means for producing a master for nano-imprinting described above.

Materials for a non-magnetic filling layer can be selected from B, C, Mg, Al, Si, Ti, V, Cr, Cu, Zn, Ge, Zr, Nb, Mo, Ru, Rh, Pd, Ag, In, Sn, Ta, W, Re, Pt, Au, Pb, alloys of these metals, or compounds of these elements and at least one element selected from oxygen, nitrogen, carbon, and hydrogen. The filling layer can also have abrasion resistance and therefore, it is preferable to select a material with high hardness. For example, carbon, particularly diamond-like carbon, carbide such as SiC and TiC, and compounds of these elements and at least one of nitrogen and hydrogen are preferably used.

A carbon film is used as a protective film. The carbon film includes a graphite film containing a large amount of $sp^2$-bonded carbon and a diamond-like carbon film containing a large amount of $sp^3$-bonded carbon. The diamond-like carbon film is superior in abrasion resistance and corrosion resistance and preferable as a protective film. The graphite film can easily be deposited by sputtering. The diamond-like carbon is generally deposited by chemical vapor deposition (CVD). By adding at least one of hydrogen, oxygen, and nitrogen to these films, adhesion properties to a lubricant can be improved.

Figure 9:
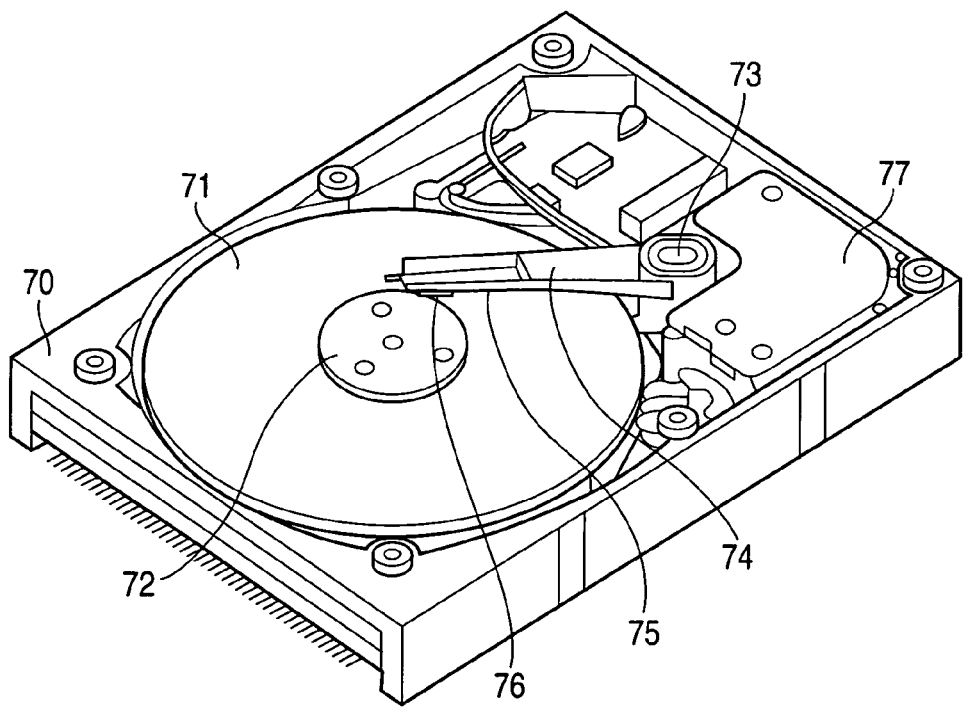
FIG. 9 is a perspective view of a magnetic recording apparatus (hard disk drive) according to an embodiment of the present invention.

FIG. 9 is a perspective view of a magnetic recording apparatus (hard disk drive) according to an embodiment of the present invention. The magnetic recording apparatus includes, in a chassis 70, a magnetic recording medium (patterned medium) 71, a spindle motor 72 for rotating the magnetic recording medium 71, a head slider 76 in which a magnetic head is fabricated, a head suspension assembly containing a suspension 75 and an actuator arm 74 to support the head slider 76, and a voice coil motor (VCM) 77 as an actuator of the head suspension assembly.

The magnetic recording medium 71 is rotated by the spindle motor 72. The head slider 76 is provided with a magnetic head including a write head and a read head. The actuator arm 74 is rotatably mounted on a pivot 73. The suspension 75 is mounted at one end of the actuator arm 74. The head slider 76 is elastically supported via a gimbal provided in the suspension 75. The voice coil motor (VCM) 77 is provided at the other end of the actuator arm 74. The voice coil motor (VCM) 77 produced rotational torque of the actuator arm 74 around the pivot 73 to position the magnetic head over any radial position of the magnetic recording medium 71 in a flying state.

EXAMPLES

The present invention will be described still more in detail below based on examples.

Example 1

A CoZrNb magnetic underlayer, Ru intermediate layer, and CoPt perpendicular oriented layer as a ferromagnetic recording layer were deposited on a glass disk substrate. A carbon film was deposited as an etching mask material and an SOG film was applied thereto. A structure of protrusions and recesses corresponding to recording cell patterns was formed in the SOG film by nano-imprinting. SOG residues on the bottoms of recesses were removed by RIE using a $CF_4$ gas to expose the carbon film and then the carbon film was etched by RIE using an oxygen gas to form etching masks. Next, the CoPt layer was etched by Ar ion milling to form isolated ferromagnetic patterns. The ferromagnetic patterns had a width of 15 nm and a pitch of 30 nm in the track direction and a width of 40 nm and a pitch of 60 nm in the radial direction.

A mask (masking shield) having a fan-shaped opening whose angle of aperture is 10 degrees was placed in a deposition chamber 10 mm above the disk substrate and the target was set so that sputtered particles were incident at an oblique angle of 70 degrees with respect to the surface of the disk substrate. Sputtering was performed while the disk substrate was being rotated at 100 rpm to form a magnetic pattern made of CoZrNb of 5 nm in thickness on the sidewall of the ferromagnetic pattern. In such a manner, recording cells including the ferromagnetic pattern and magnetic pattern were formed.

A carbon film of 50 nm in thickness was deposited as a non-magnetic filling layer by sputtering, and then the upper surfaces of the recording cells were exposed by etch-back using Ar ion milling. A protective film of 4 nm in thickness made of diamond-like carbon was deposited by plasma CVD. Further, a lubricant of 1 nm was applied.

Using a patterned medium produced in this manner, write experiments were performed on the spin stand. The experiments were performed by setting the signal frequency of writing data to the recording cell sequence arrayed at a pitch of 30 nm in the track direction so that magnetizations of adjacent recording cells were reversed with each other. From the output of the read head, read signals of about 2000 continuous 0 (upward magnetization) and 1 (downward magnetization) could be observed.

Example 2

A CoZrNb magnetic underlayer, Ru intermediate layer, and CoPt perpendicular oriented layer as a ferromagnetic recording layer were deposited on a glass disk substrate. A carbon film was deposited as an etching mask material and an SOG film was applied thereto. A structure of protrusions and recesses corresponding to recording cell patterns was formed in the SOG film by nano-imprinting. SOG residues on the bottoms of recesses were removed by RIE using a $CF_4$ gas to expose the carbon film and then the carbon film was etched by RIE using an oxygen gas to form an etching mask. Next, the CoPt layer was etched by Ar ion milling to form isolated ferromagnetic patterns. At this time, the acceleration voltage of Ar ion was set at 400 V and the angle of incidence at 80 degrees with respect to the disk surface. The ferromagnetic patterns had a width of 15 nm and a pitch of 30 nm in the track direction and a width of 40 nm and a pitch of 60 nm in the radial direction.

A mask (masking shield) having a fan-shaped opening whose angle of aperture is 10 degrees was placed 10 mm above the disk substrate and the disk substrate was irradiated with an Ar ion beam at an oblique angle of 60 degrees with respect to the surface of the disk substrate while the disk substrate was being rotated at 100 rpm. The acceleration voltage of Ar ions was set at 400 V. In such a manner, the sidewall of the ferromagnetic pattern was converted to a magnetic pattern to form a recording cell.

A carbon film of 50 nm in thickness was deposited as a non-magnetic filling layer by sputtering, and then the upper surfaces of the recording cells were exposed by etch-back using Ar ion milling. The acceleration voltage of Ar ions was set at 200 V. A protective film of 4 nm in thickness made of diamond-like carbon was deposited by plasma CVD. Further, a lubricant of 1 nm was applied.

Using a patterned medium produced in this manner, write experiments were performed on the spin stand. The experiments were performed by setting the signal frequency of writing data to the recording cell sequence arrayed at a pitch of 30 nm in the track direction so that magnetizations of adjacent recording cells were reversed with each other. From the output of the read head, read signals of about 2000 continuous 0 (upward magnetization) and 1 (downward magnetization) could be observed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium comprising:
a disk substrate; and
recording cells arrayed on the disk substrate in a track direction,
each recording cell comprising a ferromagnetic pattern and a magnetic pattern formed in direct contact with one, but not the other, of two sidewalls of the ferromagnetic pattern in the track direction and having a lower crystalline magnetic anisotropy constant Ku than that of the ferromagnetic pattern,
wherein the recording cells are surrounded by a gap or a non-magnetic material.

2. The magnetic recording medium according to claim 1, wherein the magnetic pattern of the recording cell is formed on the sidewall of the ferromagnetic pattern on a side of a servo zone corresponding to the track including the recording cells.

3. The magnetic recording medium according to claim 1, wherein the ferromagnetic pattern is formed of a material selected from a group consisting of Co, Pt, Sm, Fe, Ni, Cr, Mn, Bi, and Al and alloys thereof.

4. The magnetic recording medium according to claim 1, wherein the magnetic pattern is formed of a magnetic material comprising at least one of Fe, Ni and Co.

5. A magnetic recording apparatus comprising:
the magnetic recording medium according to claim 1; and
a magnetic head.

6. A magnetic recording medium comprising:
a disk substrate; and
recording cells arrayed on the disk substrate in a track direction with a gap or non-magnetic material provided between adjacent recording cells,
each recording cell comprising a ferromagnetic pattern and a magnetic pattern formed in direct contact with only one of two sidewalls of the ferromagnetic pattern, the magnetic pattern having a lower crystalline magnetic anisotropy constant Ku than that of the ferromagnetic pattern.

7. The magnetic recording medium according to claim 6, wherein the magnetic pattern is formed on only a part of the one sidewall of the ferromagnetic pattern.

8. The magnetic recording medium according to claim 7, wherein a lower surface of the magnetic pattern is at a level above a lower surface of the ferromagnetic pattern.

9. The magnetic recording medium according to claim 7, wherein an upper surface of the magnetic pattern is at a level below an upper surface of the ferromagnetic pattern.

* * * * *